(12) United States Patent
Macchia

(10) Patent No.: US 10,724,438 B2
(45) Date of Patent: Jul. 28, 2020

(54) APPARATUS AND METHOD FOR HEATING PRE-COMBUSTOR AIR IN A GAS TURBINE ENGINE

(71) Applicant: PRATT & WHITNEY CANADA CORP., Longueuil (CA)

(72) Inventor: Enzo Macchia, Kleinburg (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 458 days.

(21) Appl. No.: 15/497,724

(22) Filed: Apr. 26, 2017

(65) Prior Publication Data

US 2018/0313269 A1 Nov. 1, 2018

(51) Int. Cl.
*F02C 7/00* (2006.01)
*F02C 7/10* (2006.01)

(52) U.S. Cl.
CPC ............ *F02C 7/10* (2013.01); *F05D 2220/32* (2013.01); *F05D 2220/76* (2013.01); *F05D 2240/35* (2013.01); *F05D 2260/213* (2013.01)

(58) Field of Classification Search
CPC ...... F02C 7/10; F02C 7/08; F02C 1/06; F02C 1/05; F02C 3/34; F05D 2220/76; F28D 21/0003; F01D 25/10
See application file for complete search history.

(56) References Cited

U.S. PATENT DOCUMENTS

| | | | |
|---|---|---|---|
| 6,098,396 A | * | 8/2000 | Wen .................. B01D 53/9454 60/777 |
| 6,848,259 B2 | | 2/2005 | Kelller-Sornig et al. |
| 8,097,972 B2 | | 1/2012 | Macchia |
| 8,278,774 B2 | | 10/2012 | Macchia |
| 9,068,506 B2 | | 6/2015 | Eleftheriou et al. |
| 9,359,952 B2 | | 6/2016 | Menheere et al. |
| 9,482,156 B2 | * | 11/2016 | Nordstrom ............... F02C 7/10 |
| 2014/0260178 A1 | * | 9/2014 | Eleftheriou ............... F02C 7/08 60/39.511 |
| 2014/0369814 A1 | | 12/2014 | Theratil et al. |

* cited by examiner

*Primary Examiner* — Todd E Manahan
*Assistant Examiner* — Edwin Kang
(74) *Attorney, Agent, or Firm* — Norton Rose Fulbright Canada LLP

(57) ABSTRACT

Apparatus and methods for heating pre-combustor air in a gas turbine engine are disclosed. In one embodiment, a gas turbine engine configured for heating the pre-combustor air comprises a compressor for pressurizing air received in the gas turbine engine; an electric heater configured to heat the compressed air; a combustor in which the heated compressed air is received, mixed with fuel and ignited for generating combustion gas; and a turbine for extracting energy from the combustion gas. Joule heating may be used to heat the compressed air upstream of the combustor.

11 Claims, 8 Drawing Sheets

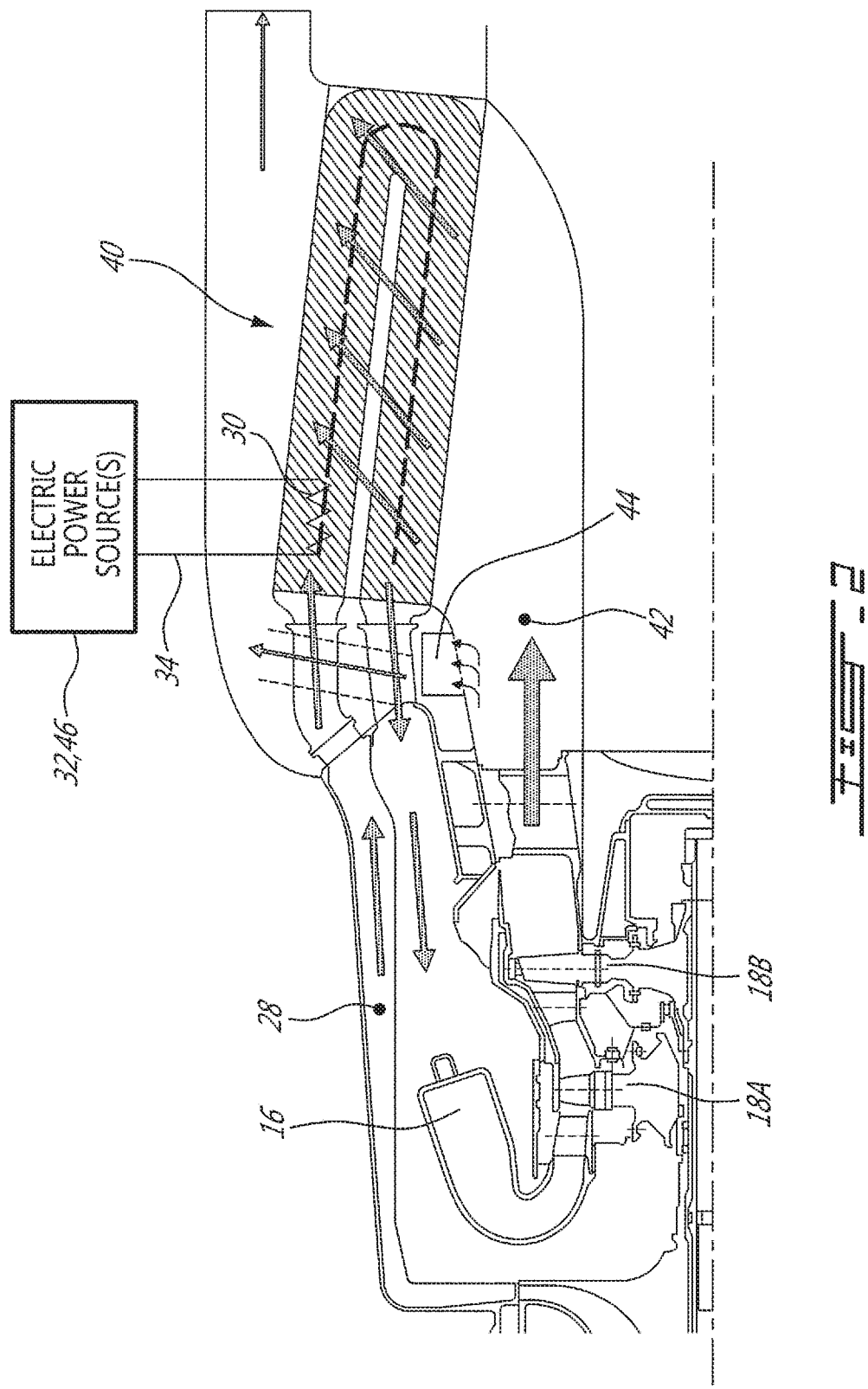

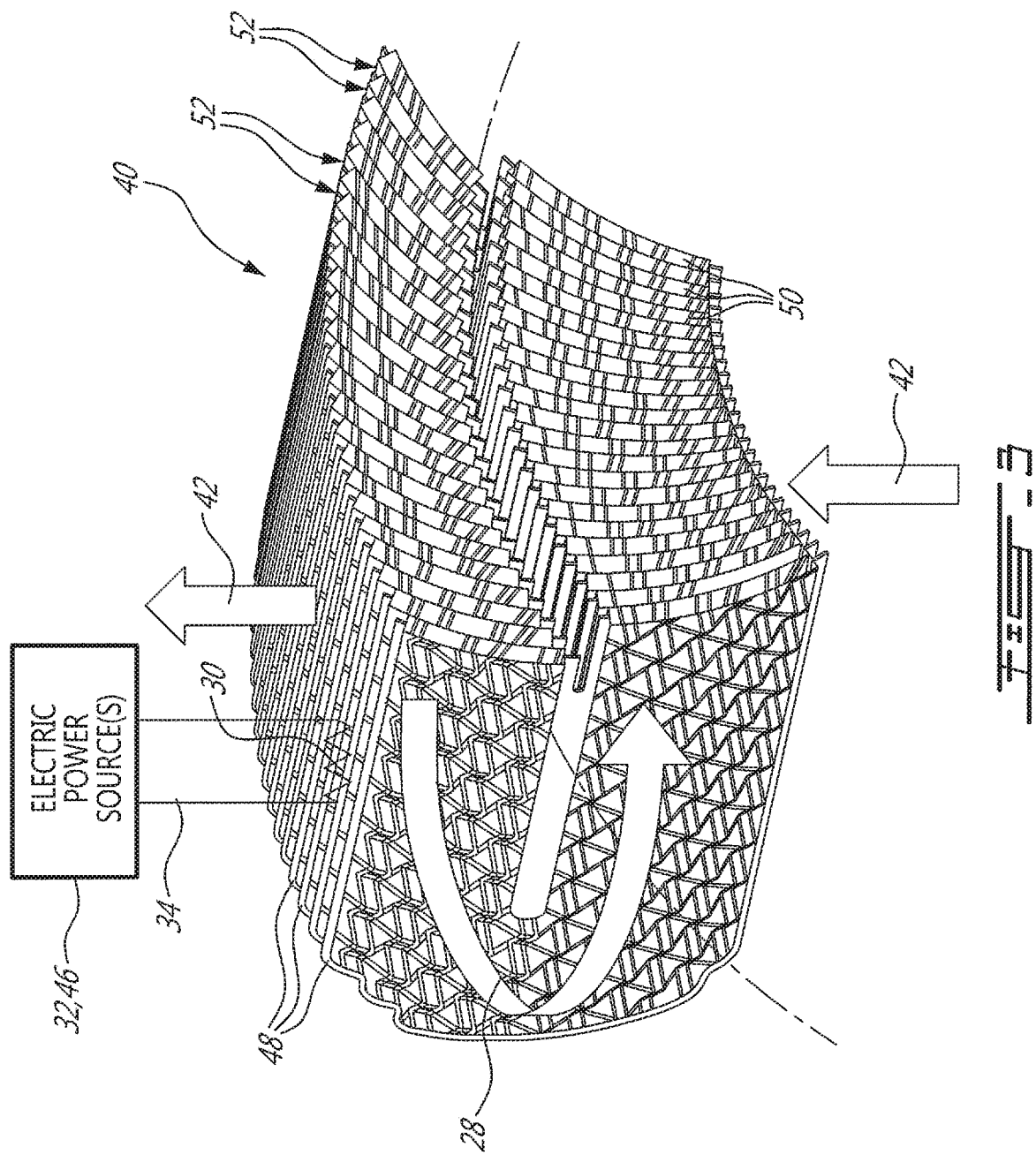

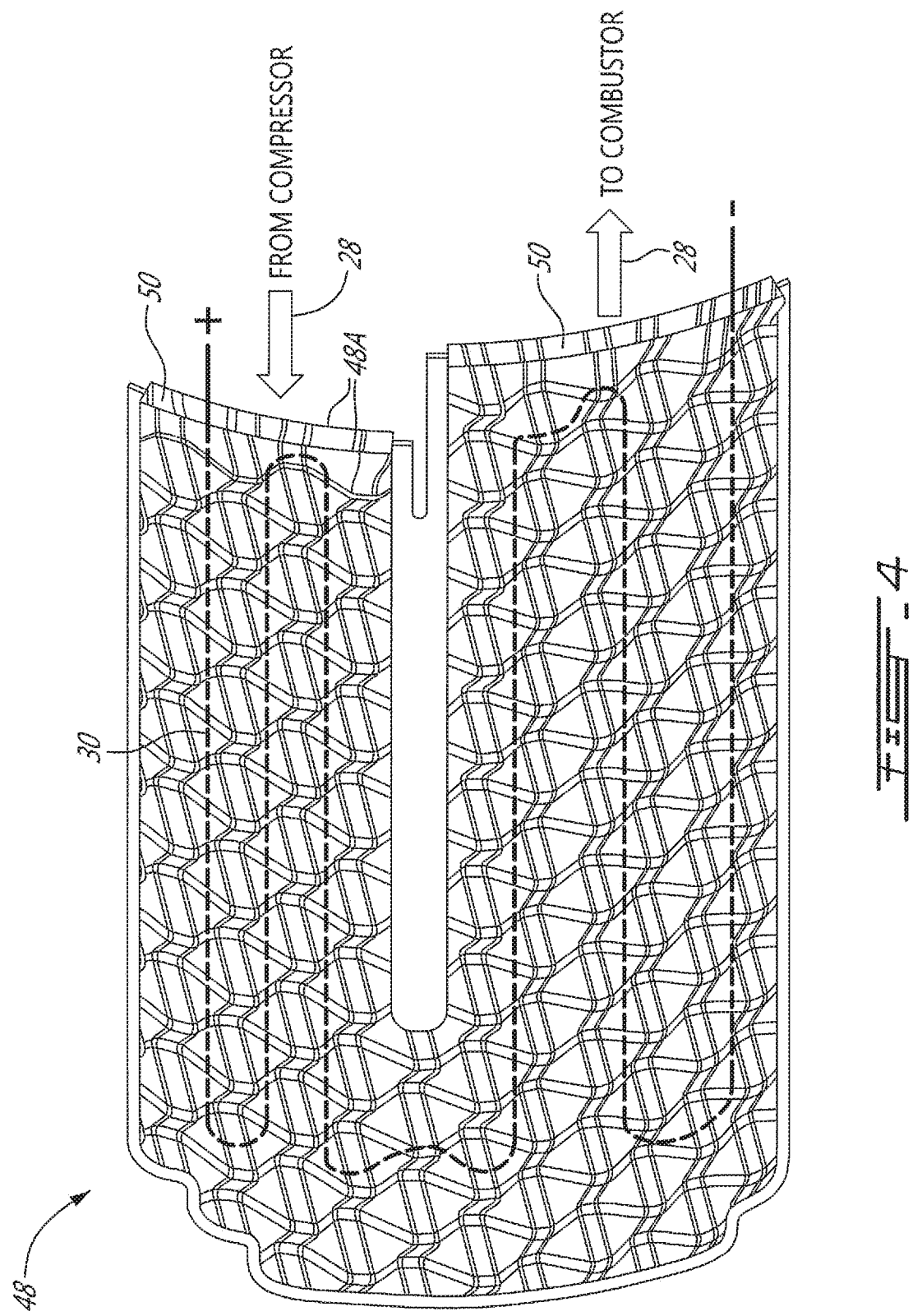

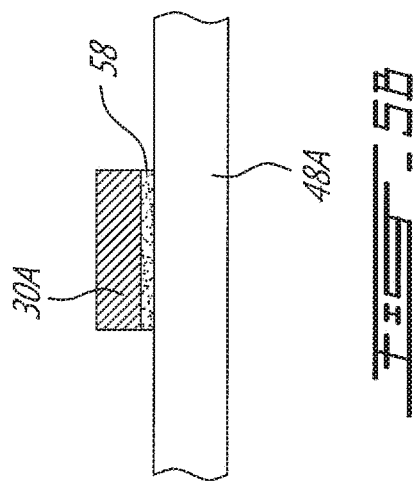
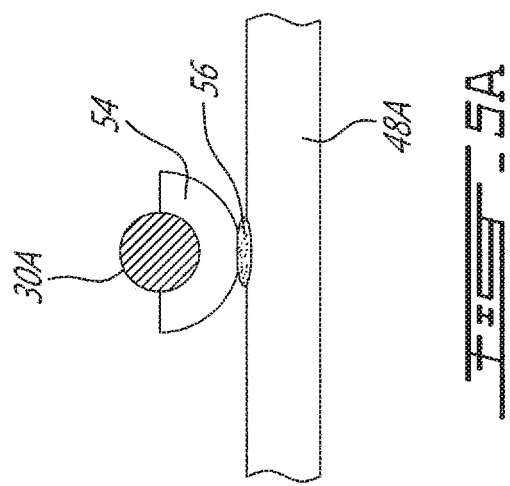

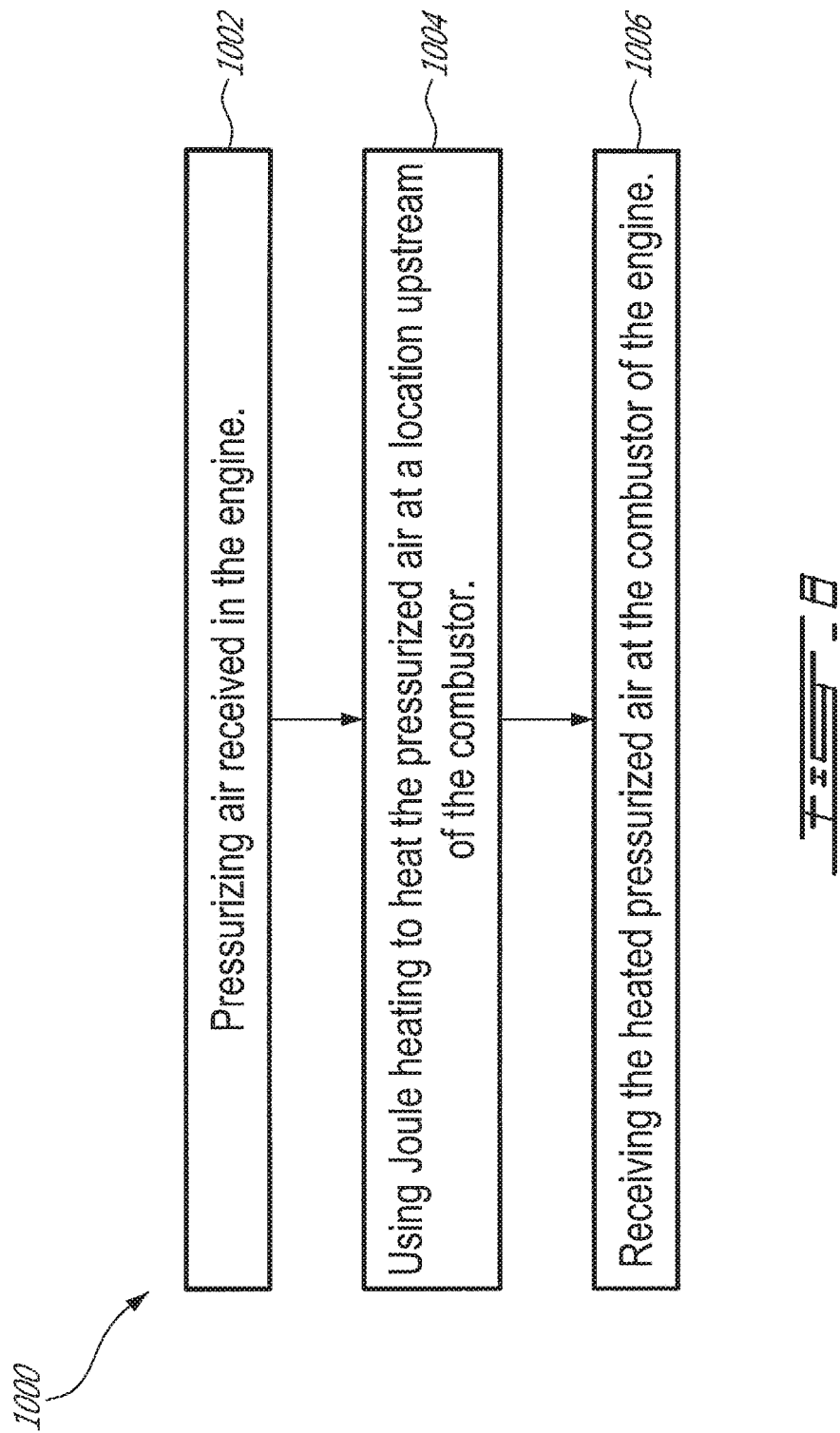

APPARATUS AND METHOD FOR HEATING PRE-COMBUSTOR AIR IN A GAS TURBINE ENGINE

TECHNICAL FIELD

The disclosure relates generally to gas turbine engines, and more particularly to the operation of gas turbine engines.

BACKGROUND

Some gas turbine engines have heat exchange recuperators that utilize hot exhaust/combustion gases from the engine to heat the pressurized air produced by the compressor prior to injection of the pressurized air into the combustor. The use of such heat exchange recuperators can be beneficial to the operation of the engine in some situations by permitting the recovery of some energy from the heat that would otherwise be discharged from the engine with the exhaust/combustion gases.

SUMMARY

In one aspect, the disclosure describes a gas turbine engine comprising:
a compressor for pressurizing air received in the gas turbine engine;
an electric heater configured to heat the compressed air;
a combustor in which the heated compressed air is received, mixed with fuel and ignited for generating combustion gas; and
a turbine for extracting energy from the combustion gas.

The gas turbine engine may comprise a heat recuperator configured to facilitate heat transfer from the combustion gas to the pressurized air, the electric heater being integrated with the recuperator.

The gas turbine engine may comprise a heat recuperator including:
a first channel configured to receive the pressurized air upstream of the combustor; and
a second channel configured to receive the combustion gas downstream of the combustor, the second channel being thermally coupled to the first channel to facilitate heat transfer from the combustion gas to the pressurized air;
wherein the electric heater is thermally coupled to the pressurized air inside the first channel.

The electric heater may comprise an electric conductor disposed inside the first channel.

The electric heater may comprise a wall of the heat recuperator at least partially defining the first channel serving as an electric conductor.

The gas turbine engine may comprise a diffuser pipe disposed upstream of the combustor and configured to direct the pressurized air, the electric heater being integrated with the diffuser pipe.

The gas turbine engine may comprise a diffuser pipe disposed upstream of the combustor and configured to direct the pressurized air, the electric heater being configured to heat the pressurized air at an exit of the diffuser pipe.

The gas turbine engine may comprise an electric generator drivingly coupled to the turbine, the electric generator being electrically coupled to power the electric heater.

Embodiments may include combinations of the above features.

In another aspect, the disclosure describes an apparatus for heating pre-combustor air in a gas turbine engine. The apparatus comprises:
a first channel configured to receive pre-combustor air upstream of a combustor of the gas turbine engine;
a second channel configured to receive combustion gas downstream of the combustor, the second channel being thermally coupled to the first channel to facilitate heat transfer from the combustion gas to the pre-combustor air; and
an electric heater thermally coupled to the pre-combustor air inside the first channel.

The electric heater may comprise an electric conductor disposed inside the first channel.

The electric heater may comprise a wall at least partially defining the first channel and serving as an electric conductor.

The apparatus may comprise an electric generator drivingly coupled to a turbine of the gas turbine engine, the electric generator being electrically coupled to drive the electric heater.

Embodiments may include combinations of the above features.

In a further aspect, the disclosure describes a method for heating pre-combustor air in a gas turbine engine. The method comprises:
pressurizing air received in the gas turbine engine;
using Joule heating to heat the pressurized air at a location upstream of the combustor; and
receiving the heated pressurized air at the combustor of the gas turbine engine.

The method may comprise:
using a heat recuperator to facilitate heat transfer from a combustion gas downstream of the combustor to the pressurized air upstream of the combustor; and
using Joule heating to heat the pressurized air at a location of the heat recuperator.

The method may comprise converting energy from a turbine of the gas turbine engine to electrical energy and using the electrical energy for the Joule heating.

The method may comprising using Joule heating to heat the pressurized air at a location of a diffuser pipe of the gas turbine engine.

The method may comprise converting energy from a turbine of the gas turbine engine to electrical energy and using the electrical energy for the Joule heating.

Embodiments may include combinations of the above features.

Further details of these and other aspects of the subject matter of this application will be apparent from the detailed description included below and the drawings.

DESCRIPTION OF THE DRAWINGS

Reference is now made to the accompanying drawings, in which:

FIG. 2 is a partial axial cross-sectional and schematic view of an exemplary heat recuperator with the electric heater integrated therewith;

FIG. 3 is a partial perspective view of the heat recuperator of FIG. 2 with the integrated electric heater shown schematically;

FIG. 4 is a perspective view of an exemplary plate assembly defining a channel of the heat recuperator of FIG. 3 where an electric conductor of the electric heater is disposed inside the channel;

FIGS. 5A and 5B are schematic representations of exemplary means for securing a conductor of the electric heater to the heat recuperator of FIG. 3;

FIG. 8 is a flowchart illustrating a method for heating pre-combustor air in a gas turbine engine.

DETAILED DESCRIPTION

The following discloses methods and apparatus useful for heating pre-combustor air in gas turbine engines. In some embodiments, the methods and apparatus disclosed herein may, in some situations, contribute toward improving fuel efficiency and reducing emissions of a gas turbine engine. In some embodiments, an electric heater may be used to heat the pre-combustor air upstream of a combustor of the gas turbine engine. In various embodiments, electric energy produced by (i.e., onboard) the gas turbine engine or from a source external to the gas turbine engine may be used to power the electric heater. In some embodiments, the electric heater may be used in conjunction with a heat recuperator for heating the pre-combustion air.

Aspects of various embodiments are described through reference to the drawings.

Figure 1:
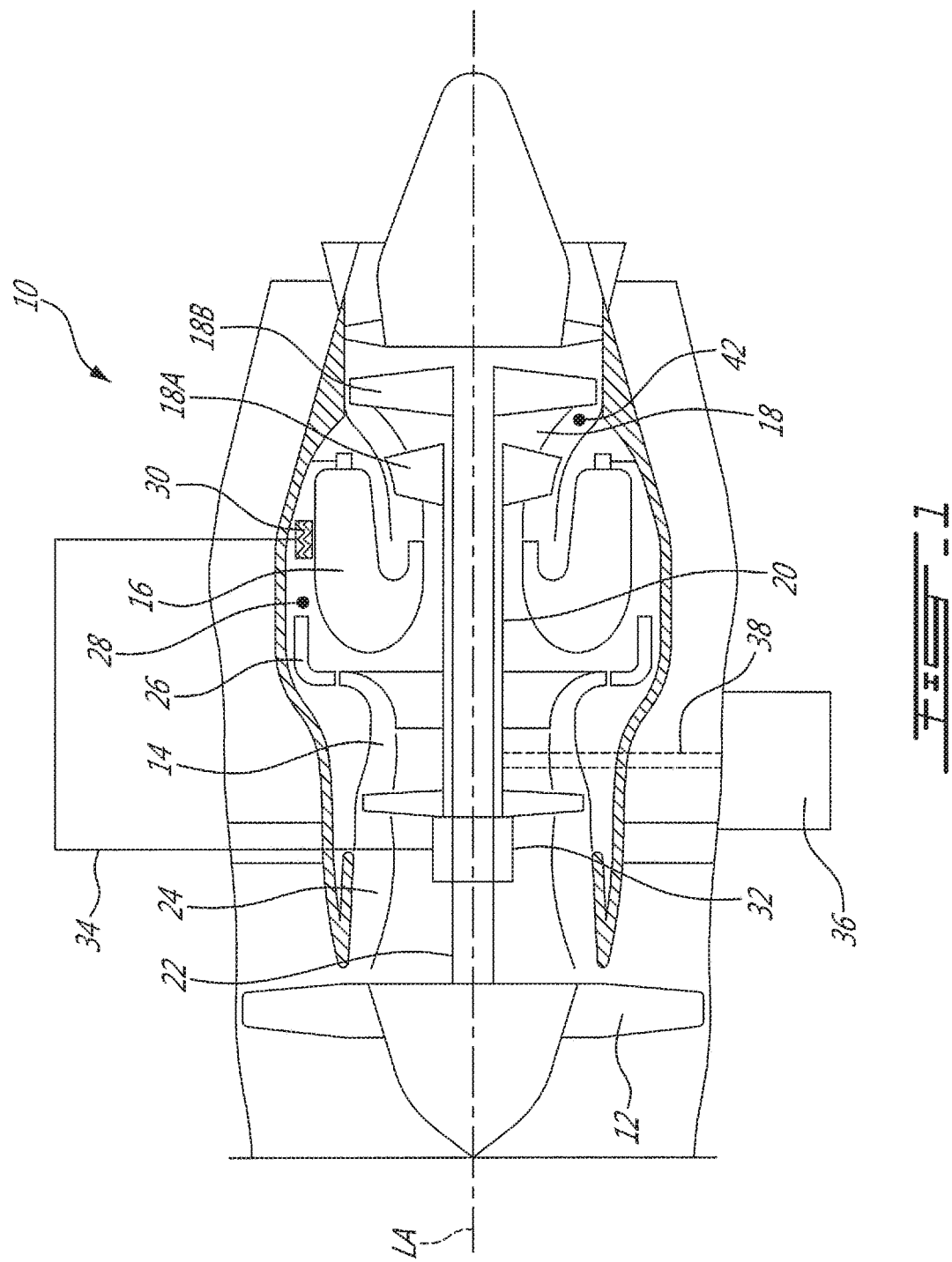
FIG. 1 is an axial cross-sectional and schematic view of an exemplary turbo-fan gas turbine engine comprising an electric heater for heating pre-combustor air.

FIG. 1 illustrates an exemplary gas turbine engine 10 (referred hereinafter as "engine 10") of a type preferably provided for use in subsonic flight, generally comprising, in serial flow communication, fan 12 through which ambient air is propelled, multistage compressor 14 for pressurizing the air, combustor 16 in which the pressurized air is mixed with fuel and ignited for generating an annular stream of hot combustion gases, and a turbine section 18 for extracting energy from the combustion gases. Engine 10 may be suitable for use in aircraft applications. It is understood that aspects of this disclosure may also be applicable to other types of gas turbine engines.

In various embodiments, engine 10 may have a dual-spool configuration but it is understood that engine 10 may not be limited to such configuration. For example, engine 10 may comprise a high-pressure spool including one or more stages of multistage compressor 14 and one or more high-pressure turbines 18A of turbine section 18 coupled together via high-pressure shaft 20. Engine 10 may also comprise a low-pressure spool including fan 12 and one or more low-pressure (i.e. power) turbines 18B of turbine section 18 coupled together via low-pressure shaft 22. In some embodiments, high-pressure shaft 20 and low-pressure shaft 22 may be mounted in a coaxial manner.

Engine 10 may have longitudinal axis LA. In some embodiments, longitudinal axis LA may correspond to an axis of rotation of fan 12. For example, longitudinal axis LA may correspond to an axis of rotation of high-pressure shaft 20 and low-pressure shaft 22 of engine 10. In some embodiments, longitudinal axis LA may correspond to a central axis of engine 10.

Engine 10 may comprise core gas path 24 in which ambient air propelled by fan 12 is directed toward compressor 14 of engine 10. Engine 10 may comprise a plurality of diffuser pipes 26 disposed downstream of compressor 14 and in fluid communication with compressor 14 and with core gas path 24. Diffuser pipes 26 may be disposed upstream of combustor 16. Diffuser pipes 26 may be distributed about longitudinal axis LA and serve to direct a flow of pressurized air 28 from compressor 14 to an annular chamber or plenum containing combustor 16. In some embodiments, the general configuration of diffuser pipes 26 may be in accordance with US Patent Publication No. 2014/0369814 A1 (Title: DIFFUSER PIPE FOR A GAS TURBINE ENGINE AND METHOD FOR MANUFACTURING SAME), which is incorporated herein by reference.

Engine 10 may comprise an apparatus for heating pre-combustor air (e.g., pressurized air 28) in engine 10. For example, engine 10 may comprise one or more electric heaters 30 (referred hereinafter in the singular) thermally coupled to the pre-combustor air (e.g., pressurized air 28) at a location upstream of combustor 16. Pressurized air 28 may be heated during its pressurization through compressor 14. However, the addition of even more heat to pressurized air 28 before its entrance into combustor 16 may nevertheless be beneficial to the operation of engine 10 in some situations. For example, in some situations, the further heating of pressurized air 28 may improve the overall efficiency (e.g., reduced fuel consumption) of engine 10 and/or may reduce emissions of engine 10 in some embodiments.

Engine 10 may comprise electric generator 32 electrically coupled to electric heater 30 via leads 34 so that electric generator 32 may power electric heater 30 in one or more modes of operation (e.g., phase(s) of flight) of engine 10. Electric generator 32 may be drivingly coupled to high-pressure shaft 20 so that electric generator 32 may be driven by high-pressure turbine 18A for example. In some embodiments, electric generator 32 may be coupled directly to high-pressure shaft 20 so that energy from high-pressure shaft 20 may be converted to electrical energy by electric generator 32 for powering electric heater 30. For example, in some embodiments, electric generator 32 may comprise a rotor having a rotation axis that is substantially coaxial with the rotation axis of high-pressure shaft 20 and that may be drivingly coupled to high-pressure shaft 20. For example, electric generator 32 may be mounted concentrically with high-pressure shaft 20 and/or low-pressure shaft 22. For example, electric generator 32 may be disposed within the core of engine 10 and may be coaxial with longitudinal axis LA. In some embodiments, the general configuration of electric generator 32 may be in accordance with U.S. Pat. No. 8,278,774 (Title: GAS TURBINE WITH WIRED SHAFT FORMING PART OF A GENERATOR/MOTOR ASSEMBLY), which is incorporated herein by reference.

In various embodiments, electric generator 32 may be operable as a motor during some mode(s) of operation of engine 10 such as starting for example. In some embodiments, electric generator 32 may be of a type known as a motor/generator and may be referred to as an electric machine. The positioning of electric generator 32 within the core of engine 10 may reduce or eliminate the need for accessory gear box 36 and may consequently reduce the drag of engine 10 if accessory gear box 36 can be of reduced size or eliminated entirely from engine 10 in order to accommodate a more streamlined engine nacelle. For example, the integration of electric generator 32 in the core of engine 10, may eliminate the need for one of the mounting pads on accessory gear box 36. In some embodiments, electric generator 32 may instead be drivingly coupled to high-pressure shaft 20 via accessory gear box 36 and tower shaft 38. Alternatively, electric generator 32 may instead be drivingly coupled to low-pressure shaft 22 so that it may be driven by low-pressure turbine 18B.

In various embodiments, electric heater 30 may be powered by electric generator 32 and/or some other electric power source(s) that may be external to engine 10. For example, electric heater 30 may be coupled to an electric bus so that it may be powered by any suitable electric power source that may provide power to such electric bus. For example, one or more current sources such as batteries of an aircraft may be used to power electric heater 30 in some embodiments. In some embodiments, such batteries may comprise ultracapacitors for example. In some embodiments, different electric power sources may be used to power electric heater 30 in different modes of operation of engine 10. The transfer of energy from within another part of engine 10 (e.g., from high-pressure shaft 20 via generator 32) may be beneficial in some mode(s) of operation of engine 10 (e.g., in a phase of flight of an aircraft to which engine 10 is mounted) and may result in an overall improvement in efficiency of engine 10 in some situations.

FIG. 2 is a partial axial cross-sectional schematic view of an exemplary heat recuperator 40 with electric heater 30 integrated therewith. In some embodiments, recuperator 40 may be used to recover heat from combustion gas(es) 42 (e.g., exhaust gas(es)) exiting turbine section 18 in order to heat the flow of pressurized air 28 being supplied to combustor 16. In some embodiments, bleed passage 44 may be provided in order to permit a flow of combustion gas 42 to bypass heat recuperator 40. Recuperator 40 may be of any suitable type configured to facilitate heat transfer from the flow of combustion gas 42 to the flow of pressurized air 28 at one or more locations downstream of compressor 14 and upstream of combustor 16. In some embodiments, the general configuration of recuperator 40 and its installation in engine 10 may be in accordance with U.S. Pat. No. 9,068, 506 (Title: TURBINE ENGINE HEAT RECUPERATOR SYSTEM), which is incorporated herein by reference. The use of electric heater 30 may supplement the heating of pressurized air 28 provided from combustion gas 42 via recuperator 40. In various embodiments, electric heater 30 may be incorporated with recuperator 40 or may be separate from recuperator 40.

FIG. 3 is a partial perspective view of recuperator 40 with electric heater 30 being shown in schematic form as being integrated with recuperator 40. Recuperator 40 may be of a type known as a "lamellar" or "stacked" heat recuperator constructed from one or more assemblies of plates or sheets made of thermally conductive material and which are arranged in a stacked formation. For example, recuperator 40 may comprise a plurality of plate assemblies 48 arranged in a circular array configuration about longitudinal axis LA (only a portion of the circular array being shown in FIG. 3). Each plate assembly 48 may define an internal first channel 50 for receiving and directing a flow of pressurized air 28. In some embodiments, first channels 50 may be U-shaped depending on installation constraints to permit the routing of pressurized air 28 to recuperator 40 and accommodate a change in direction of pressurized air 28 back to combustor 16 after passing through recuperator 40. The interstitial space(s) between adjacent plate assemblies 48 may define second channels 52 for receiving and directing a flow of combustion gas 42 through recuperator 40. Accordingly, the stacking of plate assemblies 48 in relatively close proximity to one another may provide an alternating arrangement of first channels 50 and second channels 52 for providing a relatively large surface area for conductive heat transfer across the walls of plate assemblies 48. Pressurized air 28 may flow in U-shaped first channels 50 and combustion gas 42 may flow through recuperator 40 via the interstitial second channels 52 so that heat transfer may be facilitated between the two fluids and across the walls separating the two fluids. In other words, first channels 50 may be thermally coupled to respective adjacent second channels 52 to facilitate heat transfer from combustion gas 42 to pressurized air 28 since it is expected that combustion gas 42 would have a higher temperature than pressurized air 28.

In some embodiments, the plates or walls 48A (see FIG. 4) of plate assemblies 48 may be shaped and contoured to provide a relatively large surface area for conductive heat transfer. In some embodiments, walls 48A may define features such as protrusions (e.g., domes) and recesses (e.g., dimples) that may disrupt the flow of fluid and thereby promote heat transfer. In some embodiments, walls 48A of plate assemblies 48 may be shaped in a manner similar to egg cartons for example. In some embodiments, the general configuration of recuperator 40 may be in accordance with U.S. Pat. No. 9,359,952 (Title: TURBINE ENGINE HEAT RECUPERATOR PLATE AND PLATE STACK), which is incorporated herein by reference.

FIG. 4 is a perspective view of one plate assembly 48 of recuperator 40. Plate assembly 48 may comprise two plates or walls 48A secured at some of their respective edges in order to define a first generally U-shape channel 50 therebetween to receive the flow of pressurized air 28. FIG. 4 shows an example of the integration of electric heater 30 into recuperator 40. For example, electric heater 30 may comprise an electric conductor such as one or more wires disposed inside of first channel 50 so that an electric current being conducted in the wire(s) may cause the wire(s) to heat up due to Joule heating, also known as ohmic heating and resistive heating and occurs due to the passage of an electric current through a conductor producing heat. The material, size and length of the wire(s) may be selected based on the amount of heating required and the amount of current desired to be driven through the wire(s). The design of the wire(s) of electric heater 30 may be governed in part by Ohm's law (i.e., $P=I^2R$ where P represents the power generated, I represents the electric current and R represents the electric resistance of the conductor through which the current I is driven). In some embodiments, copper- or aluminum-based materials may be suitable materials for the wire(s) of electric heater 30 to achieve Joule heating depending on the operating conditions.

In some embodiments, such wire(s) of electric heater 30 may be fastened or bonded to the inside of one or both walls 48A of plate assembly 48 so that it/they may interact with the flow of pressurized air 28 passing through first channel 50 and thereby cause heating of pressurized air 28. In other words, the wire(s) may be installed to be thermally coupled to pressurized air 28 flowing inside first channel 50. The wire(s) may be electrically coupled to (e.g., +/−) terminals of electric power source 32, 46.

In some embodiments, walls 48A may be shaped and contoured to define recessed (e.g., dimples), protrusions (e.g., domes) and/or other features. In some embodiments, the wire(s) may be weaved through such features in walls 48A and fastened or bonded to wall(s) 48A using means suitable to withstand the applicable operating conditions. In various embodiments, one or more plate assemblies 48 of recuperator 40 may be fitted with such wire(s) for the purpose of heating pressurized air 28. The portion of the wire(s) being disposed inside of first channel 50 is shown in stippled lines in FIG. 4. Alternatively or in addition, the wire(s) or other type of electric conductor of electric heater 30 may be embedded inside one or more walls 48A of plate assembly 48 in some embodiments. It is understood that electric heater 30 may comprise electrically conductive element(s) of any suitable shape/configuration (e.g., bars, plates, sheets and wire) and having an electric resistance suitable for Joule heating.

FIGS. 5A and 5B are schematic representations of exemplary means for securing exemplary conductors such as wire(s) 30A of electric heater 30 to an exemplary wall 48A of plate assembly 48 of recuperator 40. In various embodiments, wire 30A may be secured to wall 48A by any suitable methods such as, for example, one or more holders 54 for removably securing wire(s) 30A and/or more permanent means such as welds or (e.g., high-temperature) adhesives that can withstand the applicable environmental conditions.

FIG. 5A shows a schematic representation of holder 54 having the form of a bracket into which wire 30A may be removably retained. For example, holder 54 may be configured to permit wire 30A to be forcibly inserted or "snapped" therein so that a suitable frictional engagement may be provided between holder 54 and wire 30A. Alternatively, holder 54 may be configured to positively lock wire 30A therein. Holder 54 may in turn be secured to wall 48A via weld 56. The number of holders 54 may be selected to provide adequate securing of wire 30A in view of the operating conditions. In some embodiments, wire 30A may have a generally circular cross-sectional profile.

FIG. 5B shows a schematic representation of wire 30A being secured to wall 48A by way of a suitable adhesive 58. In some embodiments, wires 30A may have a non-circular cross-sectional profile. For example, wire 30A may provide a generally flat surface providing a suitable surface area for bonding of wire 30A to wall 48A using adhesive 58. In some embodiments, wire 30A may have a rectangular cross-sectional profile. In various embodiments, adhesive 58 may be used to bond a length of wire 30A to wall 48A or may be used to bond discrete points of wire 30A to wall 48A.

Figure 6:
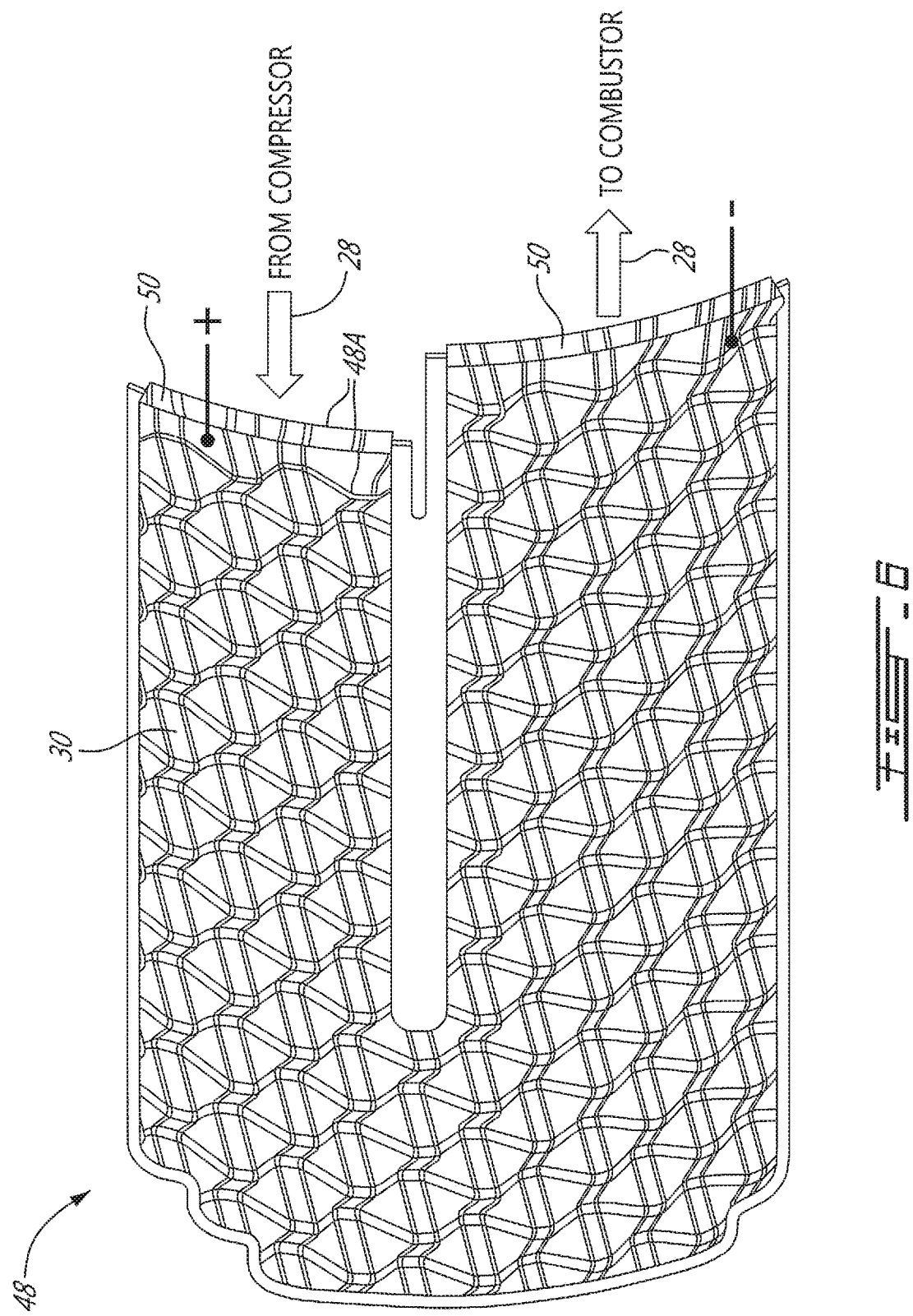
FIG. 6 is a perspective view of another exemplary plate assembly of the heat recuperator of FIG. 3 where a wall of the plate assembly defines an electric conductor of the electric heater.

FIG. 6 is a perspective view of plate assembly 48 in another embodiment where one or more walls 48A of plate assembly 48 may also serve as an electric conductor of electric heater 30. As explained above, walls 48A may be made of a metallic material of relatively good thermal conductivity and which may also be electrically conductive. Accordingly, in some embodiments, one or more of such walls 48A may itself/themselves serve as respective electric conductors which may be susceptible to Joule heating and which may form part of electric heater 30 for the purpose of heating pressurized air 28. For example, two spaced apart portions of wall 48A that are in electrical communication with each other may be electrically coupled to (e.g., +/−) terminals of electric power source 32, 46 so that an electric current may be driven through wall 48A (e.g., generally along a U-shape path) and may cause the temperature of at least a portion of wall 48A to be increased due to Joule heating and thereby cause heating of pressurized air 28 flowing through first channel 50. It is understood that one or more walls 48A in recuperator 40 may be used as heating elements of electric heater 30 and may be electrically coupled to electric power source 32, 46 in any suitable manner (e.g., in series and in parallel).

Figure 7:
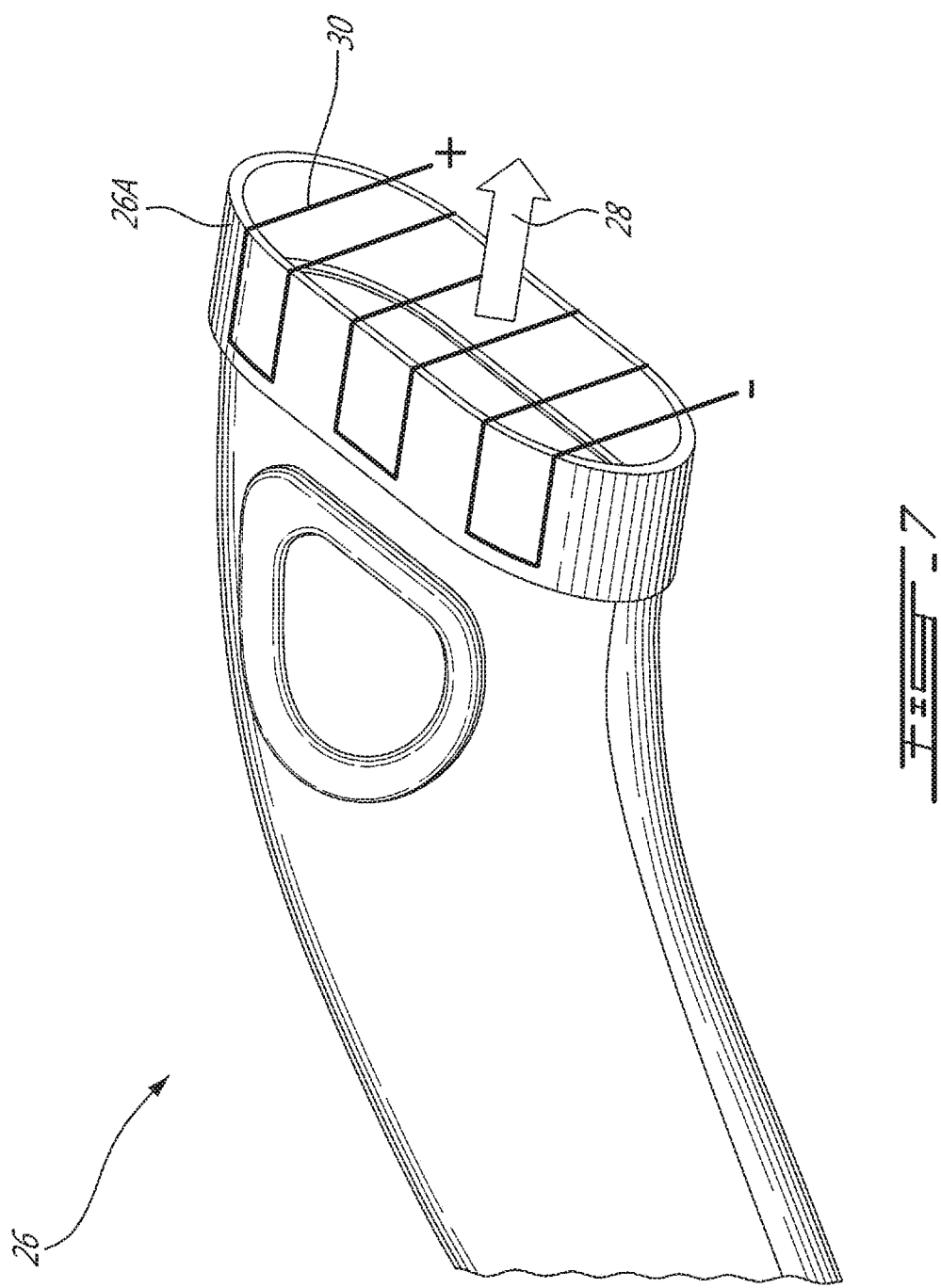
FIG. 7 is a perspective view of an exemplary diffuser pipe with an electric conductor of the electric heater shown schematically and being integrated with the diffuser pipe.

FIG. 7 is a perspective view of an exemplary diffuser pipe 26 with an electric conductor of electric heater 30 being disposed at an exit of diffuser pipe 26. It is understood that electric heater 30 or a heating element thereof may be disposed at any location suitable for heating pre-combustor air and that the specific embodiments illustrated herein are not intended to be limiting to any particular location(s). It is understood that electric heater 30 may be used with or without the use of recuperator 40 described above in various embodiments. In various embodiments, electric heater 30 may be disposed between compressor 14 and combustor 16 in relation to the stream of pressurized air 28 flowing toward combustor 16. For example, electric heater 30 may comprise a heating element susceptible to Joule heating that may be added to, form part of or otherwise integrated with diffuser pipe 26. It is understood that engine 10 may comprise a plurality of such diffuser pipes 26 and that one or more diffuser pipes 26 may be associated with electric heater 30.

In various embodiments, one or more heating elements/bars/wires may be configured to be thermally coupled to the flow of pressurized air 28 flowing in diffuser pipe 26. For example, such heating elements may extend across a flow path defined by diffuser pipe 26 in order to intersect the flow of pressurized air 28 and transfer heat thereto. For example, the heating element (e.g., wire) of electric heater 30 may be disposed inside of diffuser pipe 26 and fastened, bonded or otherwise secured to diffuser pipe 26 via suitable means. In some embodiments, electric heater 30 may be secured to diffuser pipe 26 using holder(s) 54 and/or adhesive 58 as described above.

In some embodiments, the heating element(s) of electric heater 30 may be positioned at or near an exit of diffuser pipe 26 in order to heat pressurized air 28 exiting diffuser pipe 26. For example, the heating element(s) of electric heater 30 may define a screen or mesh at the exit of diffuser pipe 26. In some embodiments, the heating element(s) of electric heater 30 may be integrated with (e.g., embedded into a wall of or secured to) diffuser pipe(s) 26 in any suitable manner. For example, electric heater 30 may be thermally coupled to outlet lip 26A of diffuser pipe 26 in order to cause heating of such outlet lip 26A so that heat may in turn be transferred from outlet lip 26A to pressurized air 28.

FIG. 8 is a flowchart illustrating a method 1000 for heating pre-combustor air (e.g., pressurized air 28) in engine 10. Method 1000 may be performed using the apparatus and electric heater 30 disclosed herein but it is understood that the performance of method 1000 is not limited to the specific exemplary embodiments of the apparatus and electric heater 30 disclosed herein. In various embodiments, method 1000 may comprise:

pressurizing air received in engine 10 (see block 1002);
using Joule heating to heat pressurized air 28 at a location upstream of combustor 16 (see block 1004); and
receiving the heated pressurized air 28 at combustor 16 of engine 10 (see block 1006).

In some embodiments, method 1000 may comprise using heat recuperator 40 to facilitate heat transfer from combustion gas 42 downstream of combustor 16 to pressurized air 28 upstream of combustor 16. Joule heating may be used to heat pressurized air 28 at a location of heat recuperator 40.

In some embodiments, method 1000 may comprise converting energy from a turbine (e.g., high-pressure turbine 18A or low-pressure turbine 18B) of engine 10 to electrical energy and using the electrical energy for the Joule heating.

In some embodiments, method 1000 may comprise using Joule heating to heat pressurized air 28 at a location of diffuser pipe 26 of engine 10.

The above description is meant to be exemplary only, and one skilled in the relevant arts will recognize that changes may be made to the embodiments described without departing from the scope of the invention disclosed. The present disclosure may be embodied in other specific forms without departing from the subject matter of the claims. The present disclosure is intended to cover and embrace all suitable changes in technology. Modifications which fall within the scope of the present invention will be apparent to those skilled in the art, in light of a review of this disclosure, and such modifications are intended to fall within the appended claims. Also, the scope of the claims should not be limited by the preferred embodiments set forth in the examples, but should be given the broadest interpretation consistent with the description as a whole.

What is claimed is:

1. A gas turbine engine comprising:
   a compressor for pressurizing air received in the gas turbine engine to generate pressurized air;
   an electric heater configured to heat the pressurized air;
   a combustor in which the pressurized air heated by the electric heater is received, mixed with fuel and ignited for generating combustion gas;
   a turbine for extracting energy from the combustion gas; and
   a heat recuperator configured to facilitate heat transfer from the combustion gas to the pressurized air upstream of the combustor, the electric heater being integrated with the heat recuperator;
   wherein the heat recuperator includes:
   a first channel configured to receive the pressurized air upstream of the combustor; and
   a second channel configured to receive the combustion gas downstream of the combustor, the second channel being thermally coupled to the first channel to facilitate the heat transfer from the combustion gas to the pressurized air;
   wherein the electric heater is thermally coupled to the pressurized air inside the first channel.

2. The gas turbine engine as defined in claim 1, wherein the electric heater comprises an electric conductor disposed inside the first channel.

3. The gas turbine engine as defined in claim 1, wherein the electric heater comprises a wall of the heat recuperator at least partially defining the first channel serving as an electric conductor.

4. The gas turbine engine as defined in claim 1, comprising an electric generator drivingly coupled to the turbine, the electric generator being electrically coupled to power the electric heater.

5. A recuperator for heating pre-combustor air in a gas turbine engine, the recuperator comprising:
   a first channel configured to receive the pre-combustor air upstream of a combustor of the gas turbine engine;
   a second channel configured to receive combustion gas downstream of the combustor, the second channel being thermally coupled to the first channel to facilitate heat transfer from the combustion gas to the pre-combustor air; and
   an electric heater thermally coupled to the pre-combustor air inside the first channel.

6. The recuperator as defined in claim 5, wherein the electric heater comprises an electric conductor disposed inside the first channel.

7. The recuperator as defined in claim 6, comprising an electric generator drivingly coupled to a turbine of the gas turbine engine, the electric generator being electrically coupled to drive the electric heater.

8. The recuperator as defined in claim 5, wherein the electric heater comprises a wall at least partially defining the first channel and serving as an electric conductor.

9. The recuperator as defined in claim 5, comprising an electric generator drivingly coupled to a turbine of the gas turbine engine, the electric generator being electrically coupled to drive the electric heater.

10. A method for heating pre-combustor air in a gas turbine engine, the method comprising:
    pressurizing air received in the gas turbine engine to generate pressurized air;
    using an electric heater disposed within a heat recuperator for Joule heating the pressurized air at a location upstream of a combustor of the gas turbine engine and within the heat recuperator that facilitates heat transfer from combustion gas downstream of the combustor to the pressurized air upstream of the combustor; and
    receiving the pressurized air that is heated by the Joule heating and by the combustion gas at the combustor of the gas turbine engine.

11. The method as defined in claim 10, comprising converting energy from a turbine of the gas turbine engine to electrical energy and using the electrical energy for the Joule heating.

* * * * *